US008630253B2

(12) United States Patent
Xiao et al.

(10) Patent No.: US 8,630,253 B2
(45) Date of Patent: Jan. 14, 2014

(54) SYSTEM AND METHOD FOR MAPPING DATA SYMBOLS

(75) Inventors: Weimin Xiao, Hoffman Estates, IL (US); Deping Liu, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 167 days.

(21) Appl. No.: 13/099,315

(22) Filed: May 2, 2011

(65) Prior Publication Data

US 2012/0281636 A1    Nov. 8, 2012

(51) Int. Cl.
*H04Q 7/00* (2006.01)
(52) U.S. Cl.
USPC .......................................... 370/330; 370/338
(58) Field of Classification Search
USPC .................................................. 370/328–338
See application file for complete search history.

(56) References Cited

U.S. PATENT DOCUMENTS

| 8,102,755 | B2 | 1/2012 | Dai et al. | |
|---|---|---|---|---|
| 2009/0245195 | A1 | 10/2009 | Bhattad et al. | |
| 2010/0272032 | A1* | 10/2010 | Sayana et al. | 370/329 |
| 2011/0228729 | A1 | 9/2011 | Dai et al. | |
| 2012/0076106 | A1* | 3/2012 | Bhattad et al. | 370/330 |

FOREIGN PATENT DOCUMENTS

| CN | 101159470 A | 4/2008 |
|---|---|---|
| CN | 101577563 A | 11/2009 |
| WO | WO 2009/120943 A2 | 10/2009 |

OTHER PUBLICATIONS

"3rd Generation Partnership Project; Technical Specification Group Radio Access Network; Evolved Universal Terrestrial Radio Access (E-UTRA); Further Advancements for E-UTRA Physical Layer Aspects (Release 9)," 3GPP TR 36.814, V9.0.0, Technical Report, Mar. 2010, 107 pages.
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.1.0, Technical Specification, Mar. 2011, 103 pages.
"3rd Generation Partnership Project; Technical Specification Group Radio Access Network; Evolved Universal Terrestrial Radio Access (E-UTRA); Multiplexing and Channel Coding (Release 10)," 3GPP TS 36.212, V10.1.0, Technical Specification, Mar. 2011, 76 pages.
International Search Report and Written Opinion of Patent Cooperation Treaty (PCT), International Application No. PCT/CN2012/074792, mailed Aug. 2, 2012, 7 pages.

* cited by examiner

*Primary Examiner* — Pao Sinkantarakorn
(74) *Attorney, Agent, or Firm* — Slater & Matsil, L.L.P.

(57) ABSTRACT

A system and method for mapping data symbols are provided. A method for communications device operations includes transmitting resource element utilization information to a communications device, and mapping symbols intended for the communications device to the plurality of resource elements. The resource element utilization information includes utilization information for a subset of resource elements out of a plurality of resource elements, the subset of resource elements corresponds to other resource elements of at least one other cell within a cooperating set, and the other resource elements are carrying specified signals. The mapping is based on the resource element utilization, and the mapping is performed by at least one cell within the cooperating set.

35 Claims, 15 Drawing Sheets

SYSTEM AND METHOD FOR MAPPING DATA SYMBOLS

TECHNICAL FIELD

The present invention relates generally to digital communications, and more particularly to a system and method for mapping data symbols.

BACKGROUND

Generally, cooperative multi-point transmission and reception (CoMP) may be considered in the Third Generation Partnership Project (3GPP) Long Term Evolution (LTE) Advanced as a tool to improve high data rate coverage, cell-edge throughput, and/or increase communications system throughput in both high and low communications system load scenarios.

In an uplink (UL) direction, where User Equipment (UE), which are also commonly referred to as mobile stations, subscribers, terminals, users, and so forth, transmits to an enhanced NodeB (eNB), which is also commonly referred to as NodeB, base station, communications controller, controller, and so on, UL coordinated multi-point reception implies reception of the UE's transmitted signals at multiple geographically separated points.

In a downlink (DL) direction, where the eNB transmits to the UE, DL coordinated multi-point transmission implies coordination among multiple geographically separated transmission points. An example of DL coordinated transmission schemes include coordinated beamforming where transmissions to a single UE is transmitted from one of the transmission points and scheduling decisions are coordinated to control, e.g., interference generated in a set of coordinated cells.

Joint processing, which may include joint transmission (JT) and dynamic cell selection (DCS), is another example of a coordinated transmission scheme with more advanced interference mitigation capability. Joint transmission involves simultaneous transmissions to a single UE from multiple transmission points, e.g., to (coherently or non-coherently) improve the received signal quality and/or actively cancel interference from other UEs. DCS involves transmissions one source point at a time within CoMP cooperating set which is a set of one or more cells participating in CoMP operation with a UE.

DL coordinated multi-point transmission includes the possibility of coordination between different cells. From a radio-interface perspective, there may be no difference from the UE perspective if the cells belong to the same eNB or different eNBs. If inter-eNB coordination is supported, information needs to be signaled between eNBs, such as via an inter-eNB interface (e.g., an X2 interface).

Multi-User (MU) Multiple Input, Multiple Output (MIMO), wherein transmissions to multiple UEs (or other destinations) sharing the same network resources (e.g., time domain and/or frequency domain network resources) may be differentiated in a spatial domain. A control channel is normally needed to schedule transmissions of each of the UEs participating in MU-MIMO. The UEs participating in MU-MIMO may be referred to herein as a UE pair or a UE group.

A heterogeneous network (HETNET) may be described as a communications system made up of full power cells, such as macro cells, typically deployed as a planned network by a service provider, and low power nodes (LPN), such as pico cells, femto cells, and so forth, that may be deployed by a service provider and/or a subscriber to help improve performance in high subscriber density areas or low coverage areas.

SUMMARY OF THE INVENTION

These and other problems are generally solved or circumvented, and technical advantages are generally achieved, by example embodiments of the present invention which provide a system and method for mapping data symbols.

In accordance with an example embodiment of the present invention, a method for cell operations is provided. The method includes transmitting resource element utilization information to a communications device, and mapping symbols intended for the communications device to the plurality of resource elements. The resource element utilization information includes utilization information for a subset of resource elements out of a plurality of resource elements, the subset of resource elements corresponds to other resource elements of at least one other cell within a cooperating set, and the other resource elements are carrying specified signals. The mapping is based on the resource element utilization, and the mapping is performed by at least one cell within the cooperating set.

In accordance with another example embodiment of the present invention, a cell is provided. The cell includes an information generator, a mapper coupled to the information generator, and a transmitter coupled to the information generator and to the mapper. The information generator generates resource element utilization information, where the resource element utilization information comprises utilization information for a subset of resource elements out of a plurality of resource elements, where the subset of resource elements corresponds to other resource elements of at least one other cell within a cooperating set, and where the other resource elements are carrying specified signals. The mapper maps symbols intended for a communications device to a plurality of resource elements, where the mapper maps the symbols based on the resource element utilization information, and where the mapping is performed by a cell that is part of a cooperating set. The transmitter transmits the resource element utilization information to the communications device.

In accordance with another example embodiment of the present invention, a method of communications device operations is provided. The method includes receiving resource element utilization information for a cell in a cooperating set, receiving signals, and decoding the signals based on the resource element utilization information. The resource element utilization information includes utilization information for a subset of resource elements out of a plurality of resource elements, the subset of resource elements corresponds to other resource elements of at least one other cell within the cooperating set, and the other resource elements are carrying specified signals.

In accordance with another example embodiment of the present invention, a communications device is provided. The communications device includes a receiver, an information processor coupled to the receiver, and a decoder coupled to the receiver and to the information processor. The receiver receives resource element utilization information for a cell in a cooperating set and receives signals. The resource element utilization information includes utilization information for a subset of resource elements out of a plurality of resource elements, the subset of resource elements corresponds to other resource elements of at least one other cell within the cooperating set, and the other resource elements are carrying specified signals. The information processor processes the resource element utilization information to extract information about the plurality of resource elements, and the decoder decodes the received signals based on the information contained in the indication.

One advantage disclosed herein is that resource elements typically used to carry a cell specific reference signals but that are unused in CoMP operation, such as CoMP Joint Transmission, CoMP Joint Processing, or so forth, may be used to carry data symbols. Overhead is thereby reduced and overall communications system performance is increased.

A further advantage of exemplary embodiments is that indications of which resource elements are used to carry data symbols may be dynamically signaled to UE, so scheduling changes may be rapidly passed onto the UE, thereby reducing overhead and improve communications system performance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE compliant communications system. The invention may also be applied, however, to other communications systems, such as WiMAX, IEEE 802.16, and other communications systems that make use of CoMP operation to improve performance.

In a 3GPP LTE compliant communications system, radio frame structures are expressed in terms of time units, where a time unit $T_s=1/(15000 \times 2048)$ seconds. DL and UL transmissions may be organized into radio frames with $T_f=307200 \times T_s=10$ ms duration. Two different radio frame structures are supported.

Figure 1A:
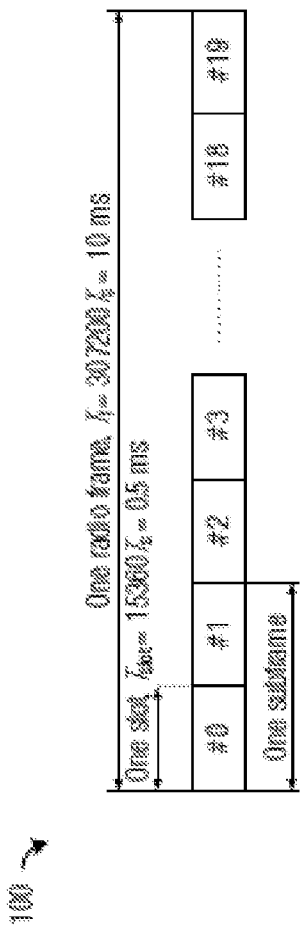
FIG. 1a illustrates an example Type 1 frame structure.

FIG. 1a illustrates a Type 1 frame structure 100. Type 1 frame structure 100 may be applicable to both full duplex and half duplex Frequency Division Duplexing (FDD) operation. Type 1 frame structure 100 is $T_f=307200 \cdot T_s=10$ ms long and consists of 20 slots of length $T_{slot}=15360 \cdot T_s=0.5$ ms each, numbered from 0 to 19. A subframe is defined as two consecutive slots where subframe i consists of slots 2i and 2i+1.

For FDD operation, 10 subframes are available for DL transmission and 10 subframes are available for UL transmission in each 10 ms interval. UL and DL transmissions are separated in the frequency domain. In half-duplex FDD operation, a UE cannot transmit and receive at the same time, while there are no such restrictions in full-duplex FDD operation.

Figure 1B:
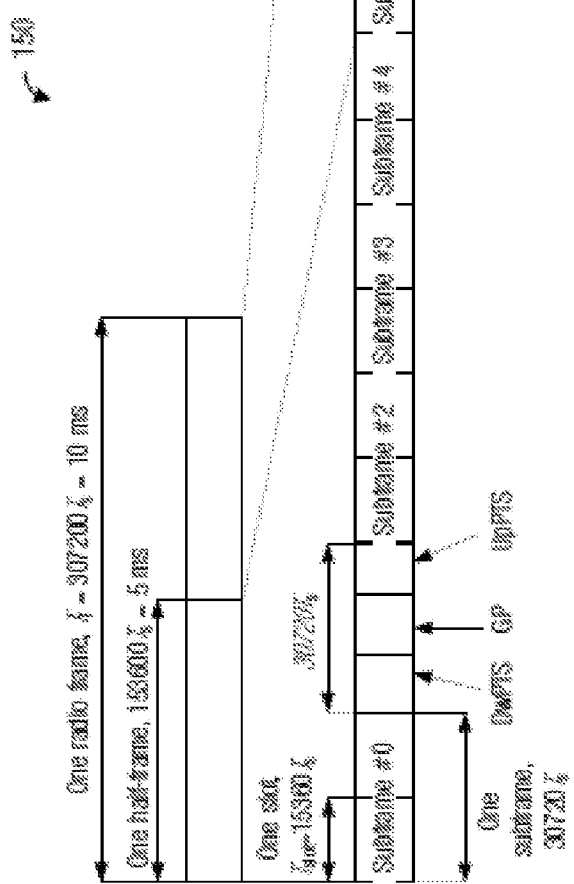
FIG. 1b illustrates an example Type 2 frame structure.

FIG. 1b illustrates a Type 2 frame structure 150. Type 2 frame structure 150 may be applicable to Time Division Duplexing (TDD) operation. Type 2 frame structure 150 consists of two half-frames, with each half-frame consisting of five subframes of length $30720 \cdot T_s=1$ ms. Each subframe i is defined as two slots, 2i and 2i+1 of length $T_{slot}=15360 \cdot T_s=0.5$ ms in each subframe.

UL-DL configurations with both 5 ms and 10 ms DL-to-UL switch-point periodicity are supported. In the case of 5 ms DL-to-UL switch-point periodicity, a special subframe consisting of three fields DwPTS, GP, and UpPTS in both half-frames. In the case of 10 ms DL-to-UL switch-point periodicity, the special subframe exists in the first half-frame only. Subframes 0, 5, and DwPTS are always reserved for DL transmission, while UpPTS and a subframe immediately following the special subframe are always reserved for UL transmission.

Figure 2:
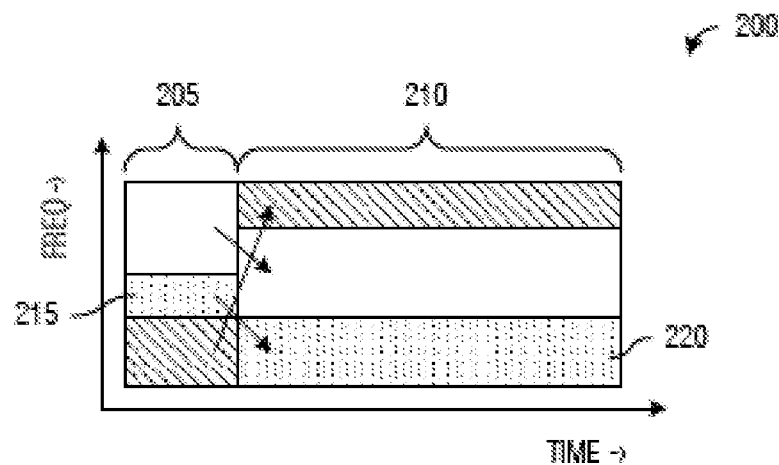
FIG. 2 illustrates an example frame structure for a DL transmission 200 for a 3GPP LTE compliant communications system according to example embodiments described herein.

FIG. 2 illustrates a frame structure for a DL transmission 200 for a 3GPP LTE compliant communications system. Note that in the frequency domain, the representation shown in FIG. 2 is logical, and does not necessarily represent the actual physical location in frequency of the various blocks. DL transmission 200 may be divided into a control region 205 and a data region 210. Control region 205 may be used to signal control channels such as a Physical Downlink Control Channel (PDCCH), a Physical Hybrid Automatic Repeat Requested (ARQ) Indicator Channel (PHICH), a Physical Control Format Indicator Channel (PCFICH), and so forth, which data region 210 may be used to signal Physical Downlink Shared Channels (PDSCH), and so on. According to the 3GPP LTE technical standards, control region 205 is composed of one to three Orthogonal Frequency Division Multiplexed (OFDM) symbols and data region 210 appears in DL transmission 200 after control region 205.

PDCCHs in control region 205, such as PDCCH 215, may mainly be used as indications of corresponding PDSCH, such as PDSCH 120, located in data region 210, allocated network resources, format, and so on. Therefore, a UE may need to first detect its PDCCH(s) and then acquire its corresponding PDSCH(s). Multiple PDCCHs may be multiplexed within control region 205. In general, a UE may search, e.g., using blind detection techniques, for its PDCCH in a search space within control region 205 until it finds its PDCCH or it completes searching the search space without finding its PDCCH. If the UE completes searching the search space and does not find its PDCCH, then there is no PDCCH intended for the UE within DL transmission 200.

Figure 3:
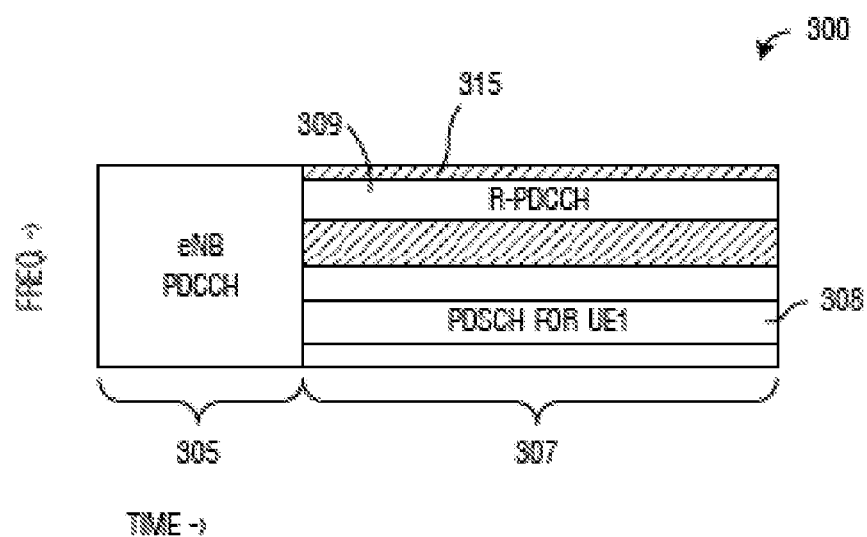
FIG. 3 illustrates an example frame structure for a DL link 300 transmission from an eNB to a relay node (RN according to example embodiments described herein.

FIG. 3 illustrates a frame structure for a DL link 300 transmission from an eNB to a relay node (RN). DL link 300 includes a control region 305 and a data region 307. Note that in the frequency domain, the representation shown in FIG. 3 is logical, and does not necessarily represent the actual physical location in frequency of the various blocks. Although control region 305 is labeled as an eNB PDCCH, control region 305 may contain other types of control channels or signals. Other types of control channels may include PCFICH, PHICH, and so forth, and other types of signals may include reference signals. Similarly, for simplicity data region 307 is shown with a PDSCH 308. Since DL link 300 is also a DL relay backhaul link, DL link 300 includes some resource elements dedicated for use as the DL relay backhaul link, such as Relay-Physical Downlink Control Channel (R-PDCCH) 309. In 3GPP LTE Release 10, an R-PDCCH may be used by an eNB (specifically, a donor eNB) to schedule transmissions on a backhaul link between the eNB and a RN. Although data region 307 is shown containing several types of channels, it may contain other channels and/or signals as well. The other types of signals may include reference signals.

In DL link 300, a RN does not know the exact location of its R-PDCCH. All it knows is that the R-PDCCH is located within a known set of resource blocks (RBs), commonly referred to as a R-PDCCH search space (an example of which is shown as search space 315 in FIG. 3). The R-PDCCH search space follows control region 205, occupying a set of subcarriers of one or several OFDM symbols in data region 307. Search space 315 may be specified by its frequency location.

R-PDCCH 309 (if present) for the RN is located in the RN's search space 315. Search space 315 may be referred to as a virtual system bandwidth, which, in general, may be considered to be a set of resource blocks that can be semi-statically configured for potential R-PDCCH transmission. In other words, time domain and/or frequency domain parameters of the set of resource blocks may be semi-statically configured. Like a PDCCH in control region 305, R-PDCCH 309 provides information to support the DL and UL transmissions. R-PDCCH 309 may include information such as: resource assignment, modulation and coding system (MCS), Hybrid Automatic Repeat Request (HARM) information, and so on. That is, R-PDCCH 309 contains the information for detecting and decoding a Physical Downlink Shared Channel (PDSCH), also known as the Un PDSCH, and the information for coding and transmitting a Physical Uplink Shared Channel (PUSCH).

The R-PDCCH may be multiplexed with the data channels, such as a PDSCH, and so forth, with time division multiplexing (TDM), frequency division multiplexing (FDM), or a combination thereof.

A relationship between R-PDCCH and its corresponding PDSCH and/or its corresponding PUSCH may be similar to the relationship between PDCCH and PDSCH and/or PUSCH with an exception being that a resource occupation style is different. R-PDCCH and PDSCH are FDM multiplexed within a time slot. In the frequency domain, a set of RBs may be semi-statically configured for potential R-PDCCH transmission, from which a subset may be allocated for each R-PDCCH.

Generally, an eNB, a RN, a low power node (LPN), or so on, may be referred to as a communications controller. Typically, communications controllers may be sectorized into a number of sectors, with each sector being referred to as a cell, to increase utilization, decrease interference, and so forth. A remote radio head (RRH) may be controlled by the communications controllers mentioned above, and may form a coverage area different from the location of the controllers. Without loss of generality, a cell, as used herein, may refer to a portion of a coverage area of a communications controller, or the coverage area of the communications controller in its entirety. Each cell may have its own cell identifier which determines the scrambling sequences of channels, the physical location of the CRS, and so on.

Figure 4A:
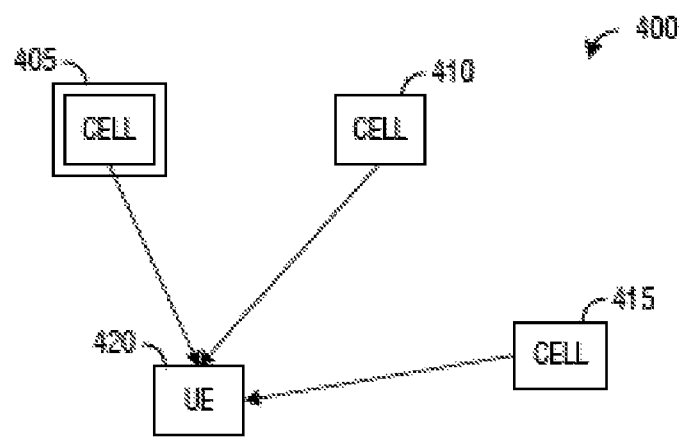
FIG. 4a illustrates an example portion of a communications system 400, wherein DL CoMP transmission between communications devices is highlighted according to example embodiments described herein.

FIG. 4a illustrates a portion of a communications system 400, wherein DL CoMP transmission between communications devices is highlighted. While it is understood that communications systems may employ multiple cells capable of communicating with a number of UEs, only three cells are illustrated for simplicity. Communications system 400 includes a first cell 405, a second cell 410, a third cell 415, and a UE 420. First cell 405, second cell 410, third cell 415, and UE 420 are participating in DL CoMP transmission. First cell 405, second cell 410, and third cell 415 may be from different communications controllers or from a single communications controller.

Typically, in DL CoMP operations a UE may receive transmissions from two or more cells, which may be macro cells, LPNs such as pico cells or femto cells, relays, remote radio heads (RRH), or combinations thereof. Therefore, the discussion of UE 420 receiving transmissions from three cells should not be construed as being limiting to either the scope or the spirit of the example embodiments.

Generally, in CoMP operation, there may be one cell that may function as a serving cell. A serving cell may also be referred to as a primary cell or a primary cell. The serving cell may perform UE mobility control (such as handover control), encryption key generation, radio link failure reporting, and so forth. The cells participating in the CoMP operation may be referred to as cooperating cells. The serving cell and the other cooperating cells may be macro cells, low power nodes (such as pico cells and/or femto cells), relays, remote radio heads, or combinations thereof.

As shown in FIG. 4a, first cell 405, second cell 410, and third cell 415 may transmit control and/or data to UE 420. UE 420 may utilize CoMP joint processing to process the transmissions from first cell 405, second cell 410, and third cell 415 to achieve improved data rate, increased reliability, lower error rate, and so forth.

Figure 4B:
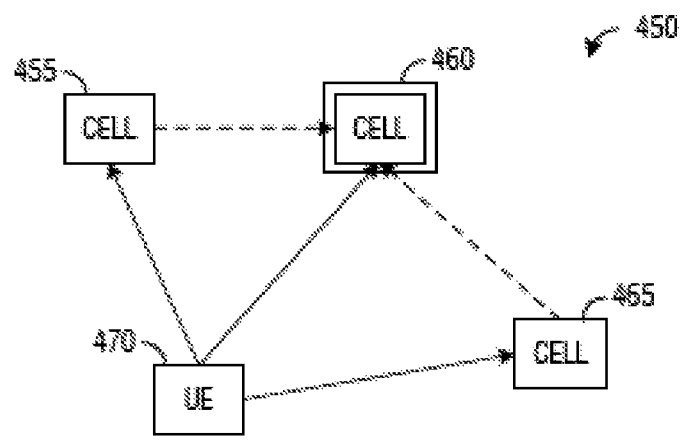
FIG. 4b illustrates an example portion of a communications system 450, wherein UL CoMP transmission between communications devices is highlighted according to example embodiments described herein.
Figure 5A:
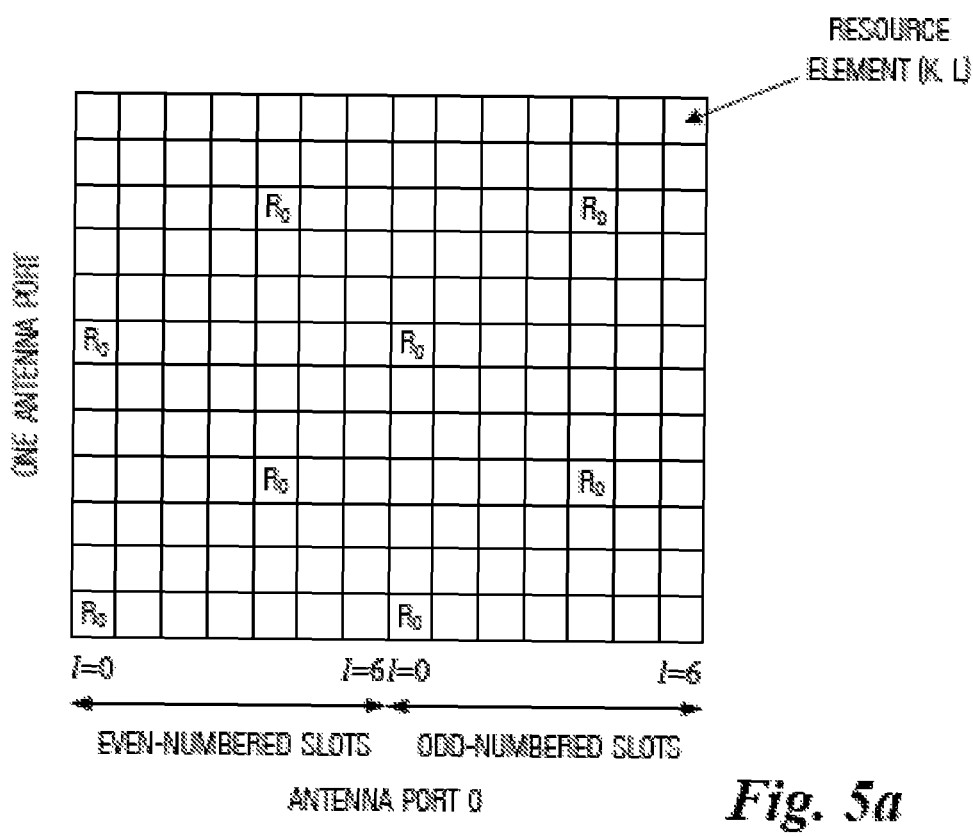
FIGS. 5a through 5g illustrate example resource elements used for reference signal transmission in a communications system with a normal cyclic prefix according to example embodiments described herein.
Figure 5B:
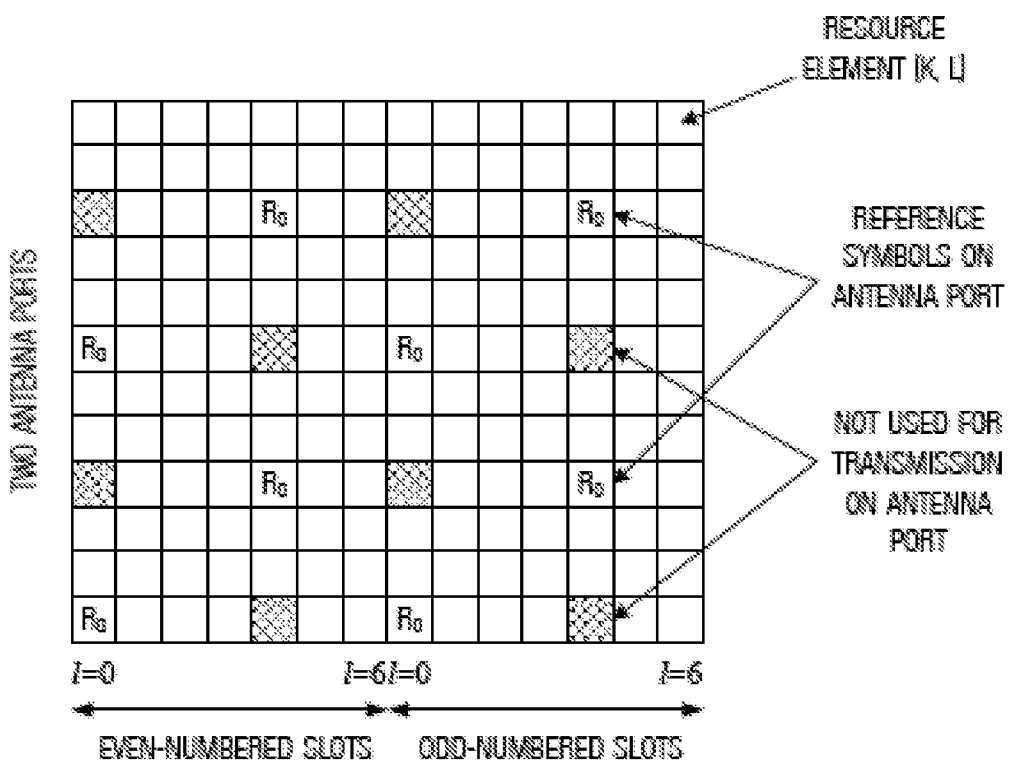
Figure 5C:
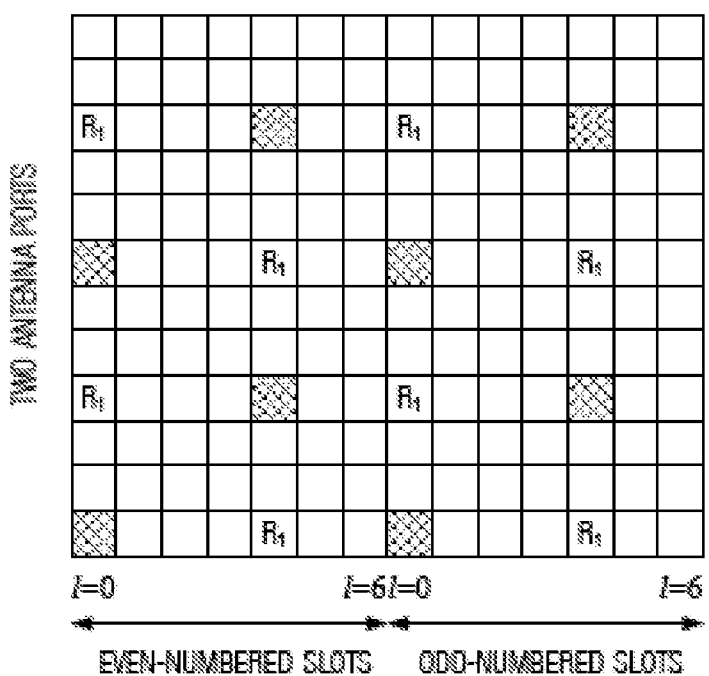
Figure 5D:
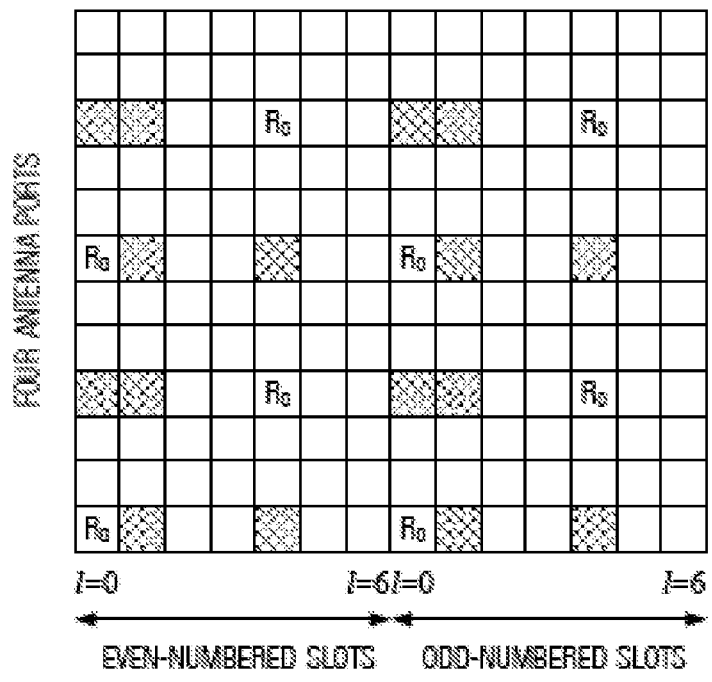
Figure 5E:
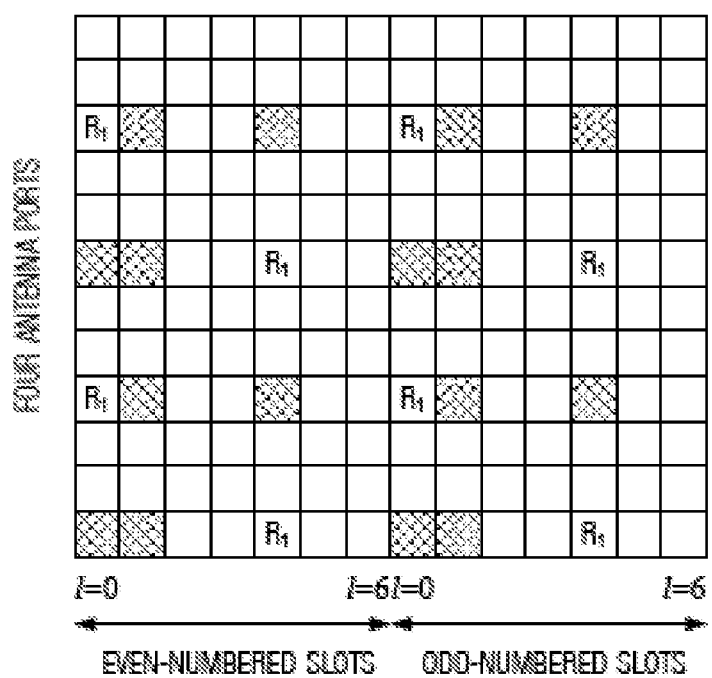
Figure 5F:
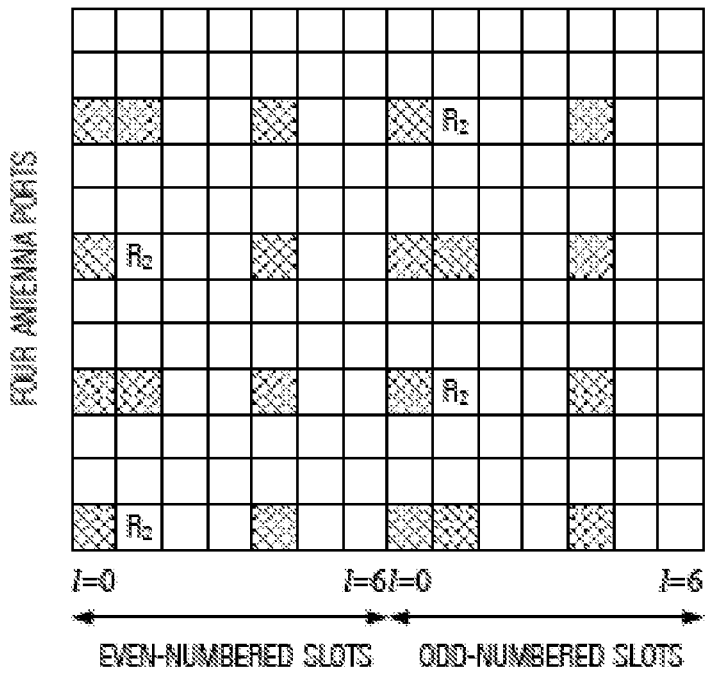
Figure 5G:
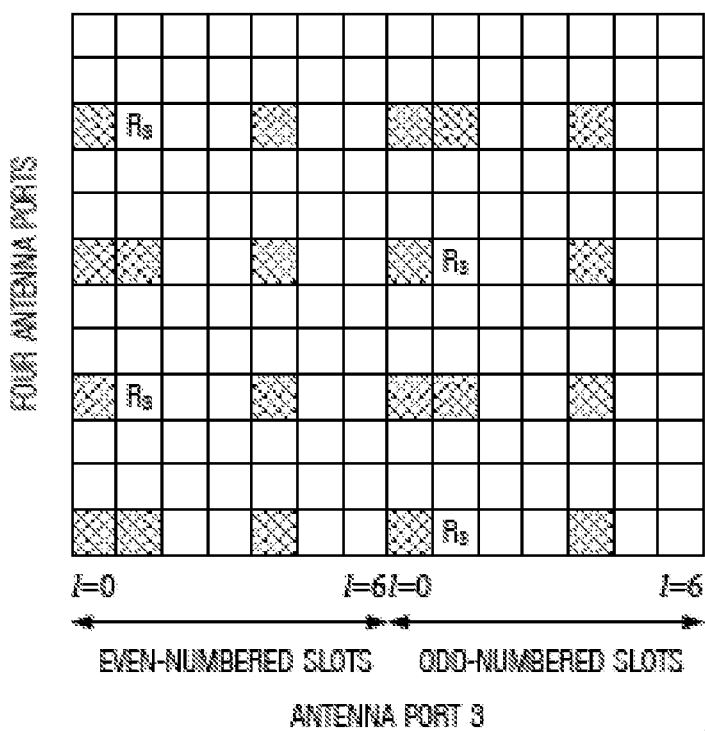
Figure 6A:
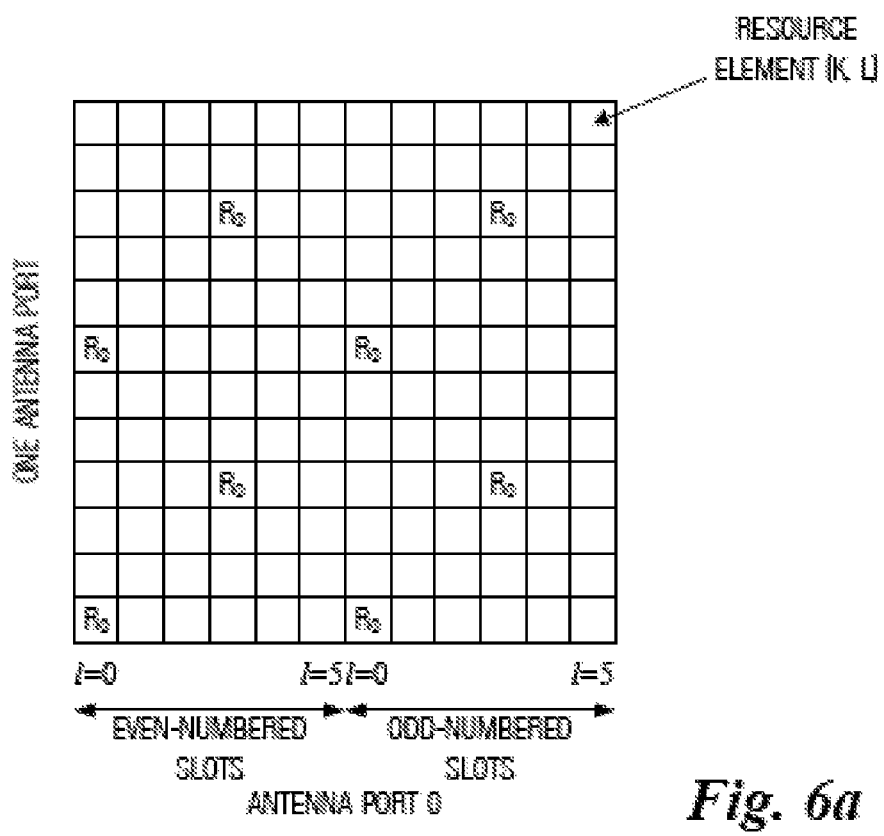
FIGS. 6a through 6g illustrate example resource elements used for reference signal transmission in a communications system with an extended cyclic prefix according to example embodiments described herein.
Figure 6B:
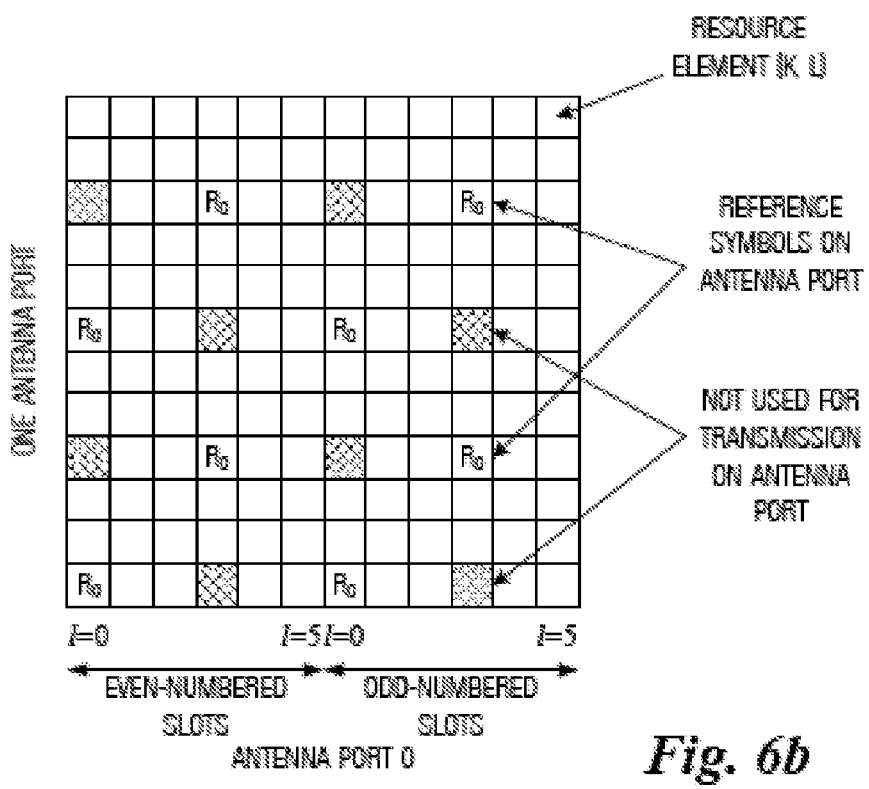
Figure 6C:
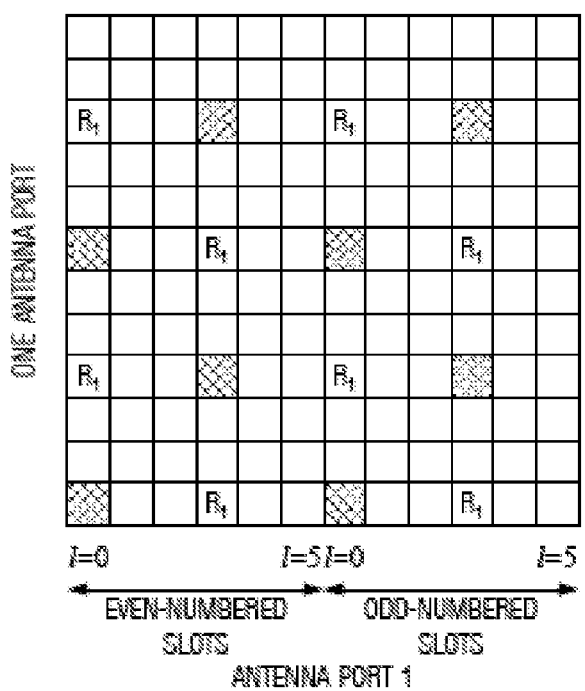
Figure 6D:
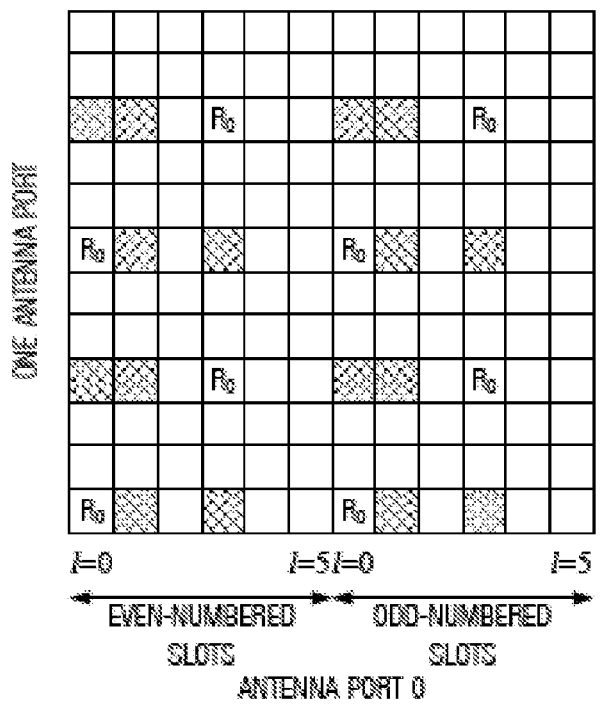
Figure 6E:
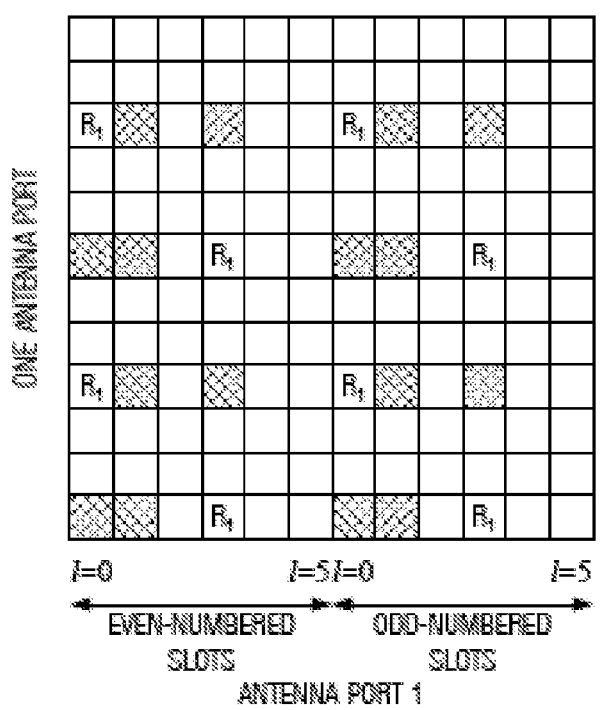
Figure 6F:
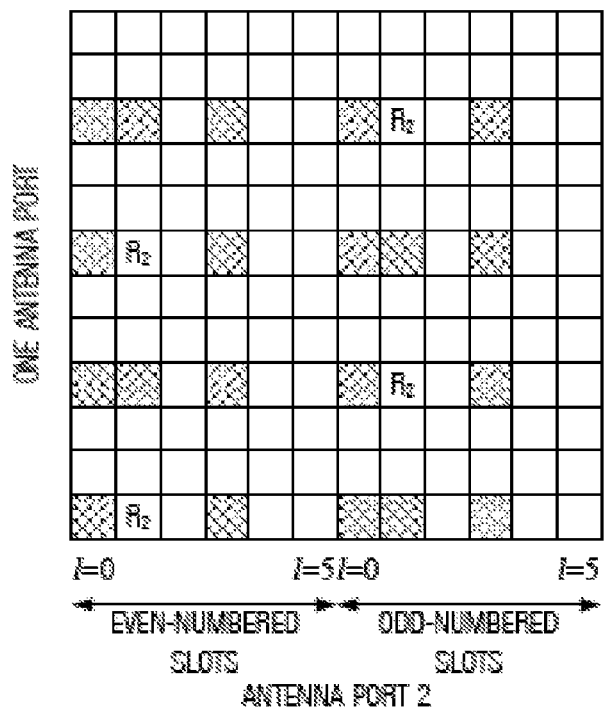
Figure 6G:
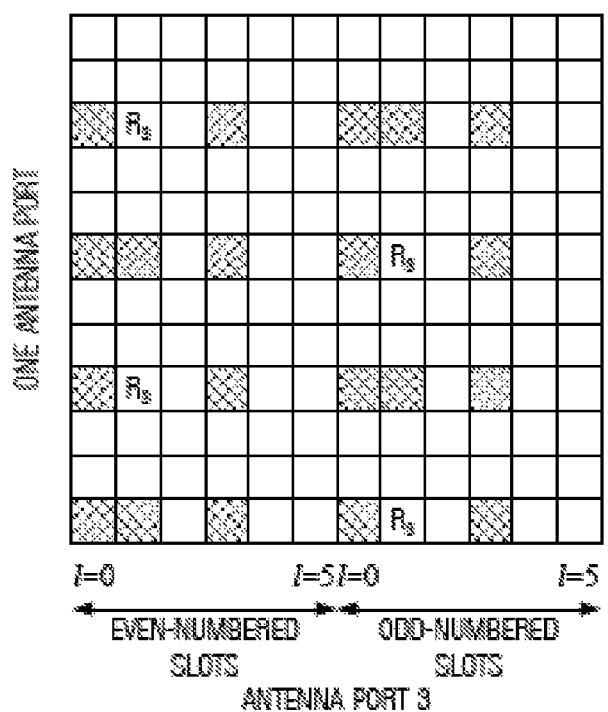

FIG. 4b illustrates a portion of a communications system 450, wherein UL CoMP transmission between communications devices is highlighted. While it is understood that communications systems may employ multiple cells capable of communicating with a number of UEs, only three cells and a single UE are illustrated for simplicity. Communications system 450 includes a first cell 455, a second cell 460, a third cell 465, and a UE 470. First cell 455, second cell 460, third cell 465, and UE 470 are participating in UL CoMP transmission. First cell 455, second cell 460, and third cell 465 may be from different communications controllers or from a single communications controller.

As shown in FIG. 4b, UE 470 may be transmitting control and/or data to first cell 455, second cell 460, and third cell 465. First cell 455 and third cell 465 may forward transmissions from UE 470 to second cell 460. First cell 455, second cell 460, and third cell 465 may jointly process transmissions from UE 470 to achieve improved data rate, increased reliability, lower error rate, and so forth. A serving cell, such as second cell 460, may coordinate transmissions from first cell 455 and third cell 465 to second cell 460.

Typically, in UL CoMP operations a cell may receive transmissions from two or more sources, which may be UEs, other macro cells, other low power nodes (LPN) such as pico cells or femto cells, relays, remote radio heads (RRH), or combinations thereof. Therefore, the discussion of second cell 460 receiving transmissions from two cells and a UE should not be construed as being limiting to either the scope or the spirit of the example embodiments.

In general, when a UE is participating in CoMP operation, for example, joint processing (either in dynamic cell selection or in joint transmission mode), the UE needs to obtain control information from control channels prior to receiving or transmitting.

In a 3GPP LTE compliant communications system, a cell-specific reference sequence may be mapped to complex-valued modulation symbols and used as reference symbols for antenna port p in slot $n_s$. Resource elements (k, l) used for reference signal transmission on any of the antenna ports in a slot may not be used for the transmission on any other antenna port in the same slot and be set to zero. Within a Multi-Media Broadcast over a Single Frequency Network (MBSFN) subframe, cell-specific reference signals (CRS) may only be transmitted in non-MBSFN region of the MBSFN subframe.

FIGS. 5a through 5g illustrate resource elements used for reference signal transmission in a communications system with a normal cyclic prefix. As shown in FIGS. 5a through 5g, $R_p$ is used to denote a resource element used for reference signal transmission on antenna port p for one-, two-, and four-antenna port situations. Furthermore, cross-hatched boxes indicate the resource elements which are null, not used for either transmission of reference signals or for data transmission. FIGS. 5a through 5g also illustrate a cell-specific shift in the frequency domain, wherein the cell-specific shift in frequency domain is determined by an identifier of the cell, such as Cell ID.

FIGS. 6a through 6g illustrate resource elements used for reference signal transmission in a communications system with an extended cyclic prefix. As shown in FIGS. 6a through 6g, $R_p$ is used to denote a resource element used for reference signal transmission on antenna port p for one-, two-, and four-antenna port configurations. Furthermore, cross-hatched boxes indicate the resource elements which are null, not used for either transmission of reference signals or for data transmission.

For each of the antenna ports used for transmission of the physical channel, the blocks of complex-valued symbols may be mapped in sequence to resource elements which meet the following criteria:
   The resource elements are in physical resource blocks corresponding to virtual resource blocks assigned for transmission;
   The resource elements are not used for transmission of PBCH, synchronization signals, CRS, MBSFN reference signals, or UE-specific reference signals; and
   The resource elements are not in an OFDM symbol used for PDCCH.

The mapping to resource elements on antenna port p not reserved for other purposes may be in increasing order of first index k over the assigned physical resource blocks and then index l, starting with the first slot in a subframe.

Figure 7:
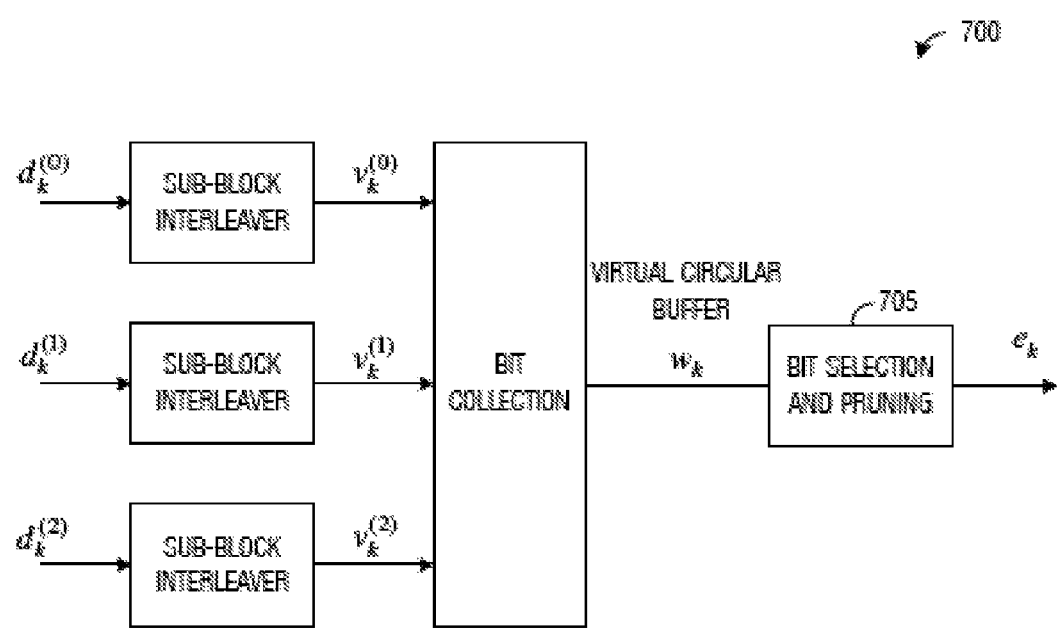
FIG. 7 illustrates an example rate matching unit 700 for turbo coded transport channel according to example embodiments described herein.

FIG. 7 illustrates a rate matching unit 700 for turbo coded transport channel. A bit selection and pruning unit 705 of rate matching unit 700 an exact number of available resource elements is needed as a parameter to determine exact output size.

When multiple cells (eNBs, RNs, RRH, and so forth) are simultaneously transmitting signals to a UE when the UE is in CoMP joint processing mode, all of the cells involved may have their own CRS, the reference signals of the different cells may occupy different resource elements (with the location being dependent on an identifier of cell, such as a Cell ID) as discussed in FIGS. 5a through 5g and 6a through 6g.

A simple technique for mapping data symbols to resource elements is to map the data symbols to the resource elements while excluding those resource elements corresponding to the CRS of all of the cells. However, by doing so, resource elements may be wasted, especially when different cells are transmitting different data streams.

As seen in FIGS. 5b through 5g and 6b through 6g, a certain number of resource elements are used for transmission of reference signals. As an example, the percentage of reference signal overhead is 1/21, 2/21, and 3/21 for one-, two-, and four-antenna port configurations in case of a normal cyclic prefix. Then, in an N-cell co-transmission, a considerable amount of resource elements may be saved by utilizing the resource elements corresponding to the CRS of other cells to carry data symbols.

In the simple technique of excluding the resource elements corresponding to the CRS, a cell can only skip the resource elements carrying its own CRS, and map the data symbols to the remaining resource elements, although some of the remaining resource elements may correspond to the CRS of other cells. Therefore, the decoding performance may be negatively impacted but some resource element overhead may be saved.

Therefore, the UE may need to know that the data symbols are sometimes mapped to fewer resource elements excluding the resource elements corresponding to the specified signals (such as such as CRS, P-BCH, SCH, and so forth) of a cell or cells other than the cell making the transmission. The UE may also need to know that the data symbols are sometimes mapped to more resource elements excluding the resource elements the cell making the transmission. In other words, the UE may need to know which resource elements may require special processing. The UE may receive information (or an indication of the information) to inform it which resource elements require special processing.

Although the discussion focuses on using the resource elements corresponding to the resource elements of transmissions from other cell(s) carrying the CRS of the other cell(s) to carry data symbols, the example embodiments may also be used to use the resource elements corresponding to the resource elements of transmissions from other cell(s) carrying Physical Broadcast Channel (BCH), Sync Channel (SCH) of other cell(s), and so forth. In addition to carrying data symbols, the resource elements may also be used to carry no data symbols at all (e.g., null symbols), data symbols but using a different transmission method from the remaining resource elements carrying data symbols, for example with a different precoding matrix and/or vector (i.e., precoding information), data symbols based on a reference signal different from the reference signal of the cell making the transmission, and so forth. Therefore the discussion of CRS and using the resource elements for data transmission (e.g., data symbols) should not be construed as being limiting to the scope or the spirit of the example embodiments.

Furthermore, although the discussion focuses on using resource elements corresponding to the resource elements of transmissions from other cell(s) carrying or specified signals (such as CRS, P-BCH, SCH, and so forth) of the other cell(s) to carry data symbols, no data symbols at all (e.g., null symbols), data symbols but with different transmission method (such as a different precoding matrix and/or vector (or different precoding information)), data symbols based on a different reference signal and so forth. Therefore the discussion of data symbols should not be construed as being limiting to the scope or the spirit of the example embodiments.

Figure 8:
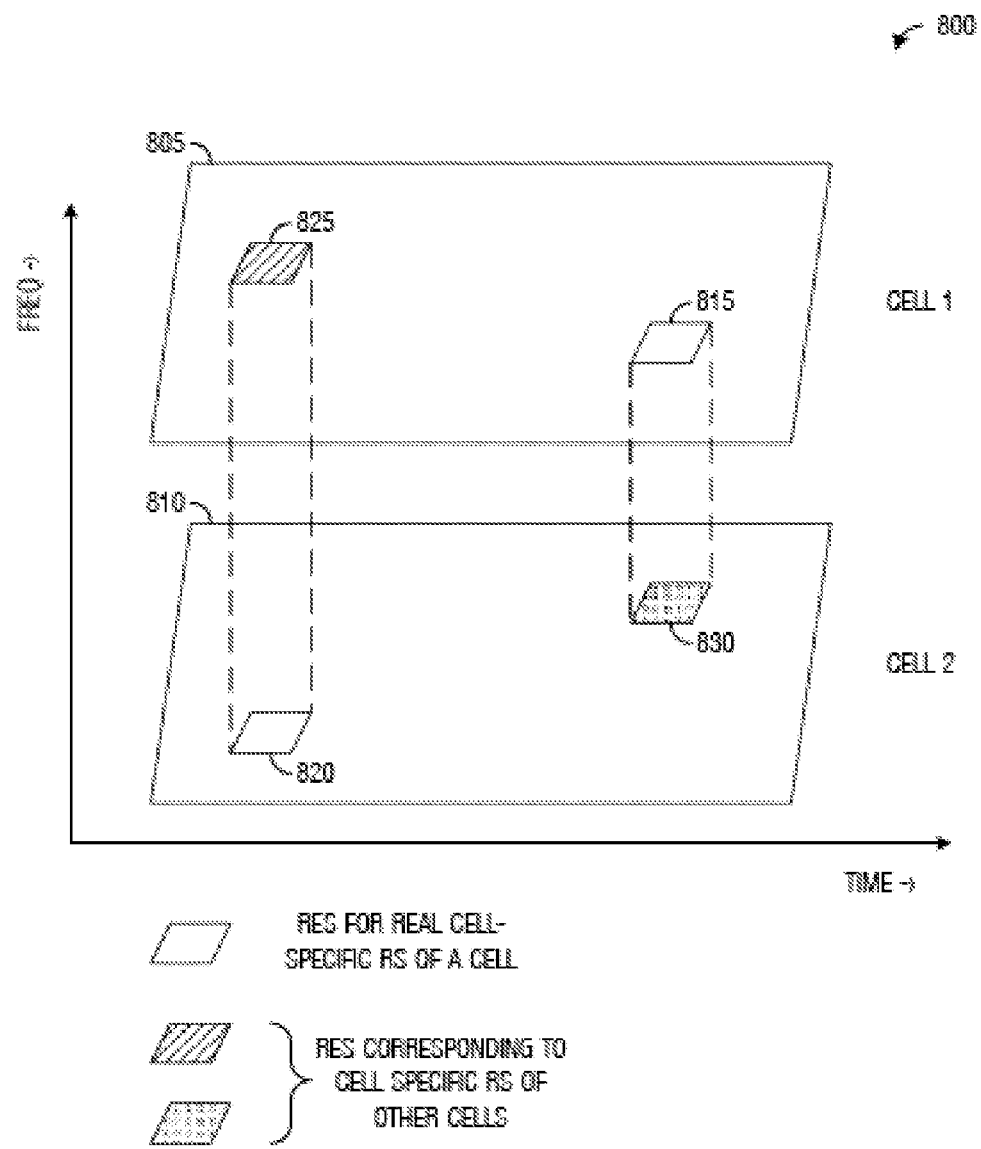
FIG. 8 illustrates an example diagram 800 of time-frequency resources according to example embodiments described herein.

FIG. 8 illustrates a diagram 800 of time-frequency resources. Diagram 800 illustrates two groups of time-frequency resources, a first group 805 and a second group 810. First group 805 may represent time-frequency resources of a first cell (e.g., cell 1) and second group 810 may represent time-frequency resources of a second cell (e.g., cell 2). Although shown in FIG. 8 as being separated in logically frequency, FIG. 8 may not represent an actual physical location of time-frequency resources in first group 805 and second group 810. As an example first group 805 and second group 810 may share frequency bands but may be deployed in different geographical locations.

Although FIG. 8 illustrates two groups of time-frequency resources associated with two cells, in general, the techniques described herein may be applied to any number of groups of time-frequency resources associated with any number of cells. Therefore, the discussion of two groups of time-frequency resources and two cells should not be construed as being limiting to either the scope or the spirit of the embodiments.

Unshaded blocks, such as block 815 and block 820, may represent resource elements for real CRS of cells, with block 815 representing resource elements for real CRS of the first cell and block 820 representing resource elements for real CRS for the second cell.

Cross-hatched blocks, such as block 825 and block 830, may represent resource elements corresponding to CRS of other cells, with block 825 representing resource elements corresponding to CRS of the second cell and block 830 representing resource elements corresponding to CRS of the first cell. Typically, the resource elements that correspond to resource elements carrying CRS of other cells (e.g., the cross-hatched blocks) are not used to carry data symbols.

If all cells of a plurality of cells (the first cell and the second cell in this situation) are transmitting to a single UE, then any cell among the plurality of cells may skip all the resource elements corresponding to resource elements used to carry CRS in transmissions of other cells in the plurality of cells when mapping data symbols to resource elements to guarantee the combining and decoding performance at the UE's receiver. None of the blocks shown in FIG. 8, i.e., blocks 815 through 830, may be used to transmit data to a UE in any cell.

However, if different cells in the plurality of cells are transmitting different data streams to a single UE (as in single user MIMO (SU-MIMO)) or multiple UEs (as in MU-MIMO), then any cell within the cells participating in SU-MIMO or MU-MIMO may be able to skip only the resource elements corresponding to its own CRS when mapping data symbols to resource elements to acquire more REs for the purpose of data transmission. As shown in FIG. 8, the cross-hatched blocks (e.g., block 825 and block 830), which correspond to blocks 815 and 820, may be used to transmit data to a UE in any cell.

In order to use resource elements corresponding to the resource elements of transmissions from other cell(s) carrying the specified signals (such as such as CRS, P-BCH, SCH, and so forth) of the other cell(s) to carry symbols (such as data symbols, no data symbols at all (e.g., null symbols), data symbols but using a different transmission method from the remaining resource elements carrying data symbols, for example with a different precoding matrix and/or vector (i.e., precoding information), carry data symbols based on a reference signal different from the reference signal of the cell making the transmission, and so forth), the UEs may be informed that the resource element(s) are carrying the symbols. Informing the UEs may be important since the UE may need the information in order to properly detect the data symbols when it detects received signals.

Figure 9:
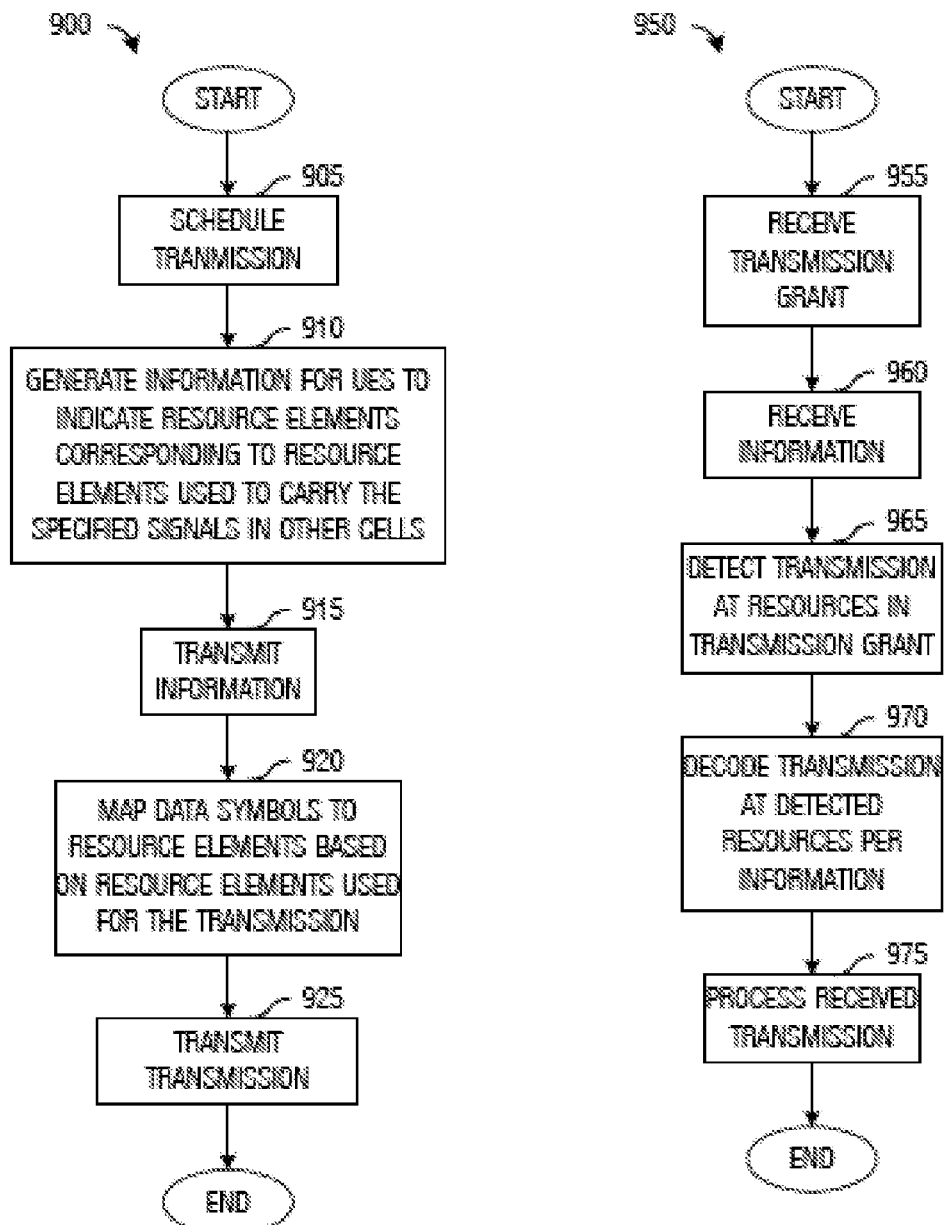
FIG. 9a illustrates an example flow diagram of communications controller operations 900 in transmitting to one or more communications devices according to example embodiments described herein.
FIG. 9b illustrates an example flow diagram of communications device operations 950 in receiving a transmission from one or more communications controllers according to example embodiments described herein.

FIG. 9a illustrates a flow diagram of cell operations 900 in transmitting to one or more communications devices. Cell operations 900 may be indicative of operations occurring in a cell, as the cell transmits to the communications device. The cell may be transmitting control information, data, or a combination thereof, to the communications device. Cell operations 900 may occur while the cell is in a normal operating mode.

Cell operations 900, may begin with the cell sending control channels with information related to a transmission scheduled by the cell (in block 905), such as network resources, modulation and coding scheme, and so forth, to the communications device(s).

The cell may generate resource element utilization information (or an indication thereof) to be transmitted to the communications device(s), the information or the indication may be about: a) the resource elements corresponding to resource elements used to carry the specified signals, such as CRS, P-BCH, SCH, and so forth, in the transmissions made by other cells, are for symbol (or other information) transmission, b) the resource elements corresponding to resource elements used to carry the specified signals, such as CRS, P-BCH, SCH, and so forth, in transmissions made by other cells, are not for symbol transmission, or c) a combination thereof (block 910).

As an example, a single bit indication may be used. If the indication is set to a first value, then the resource elements corresponding to resource elements used to carry the specified signals in transmissions made by other cells is used for symbol transmission and if the indication is set to a second value, then the resource elements corresponding to resource elements used to carry the specified symbols in transmissions made by other cells is not used for symbol transmission.

As an example, multi-bit indications may be used to provide information about subsets of the resource elements corresponding to resource elements used to carry the specified signals in transmissions made by other cells being used or not being used for symbol transmission.

As an example, if there are N resource elements corresponding to resource elements used to carry the specified signals in transmissions made by other cells and if due to cell decisions, M of the resource elements are used to carry symbols (where N and M are integer values, and M is less than or equal to N), then the indication may indicate the M resource elements are used to carry symbols, the indication may indicate the N−M resource elements are not used to carry the symbols, or a combination thereof.

According to an example embodiment, the information regarding the mapping of the resource elements may be explicitly notified to a communications device. As an example, a new field may be defined to convey the mapping of the resource elements to the communications device. Alternatively, an existing field or fields may be used to convey the mapping of the resource elements to the communications device under some circumstances. Alternatively, available states of an existing field or existing fields may be used to convey the mapping of the resource elements to the communications device.

According to an example embodiment, the information regarding the mapping of the resource elements may be implicitly notified to a communications device. As an example, the information may be combined with some other information, e.g., a transmission mode, a newly defined CoMP mode, or so on. Consider a transmission mode as an example. When a transmission mode is equal to X for a communications device, where X is a pre-defined transmission mode, then the communications device knows that resource elements corresponding to the specified signals (such as CRS, P-BCH, SCH, and so forth) of a pre-defined cell(s) are excluded (or included) and may perform detection accordingly.

According to an example embodiment, the information may be dynamically indicated. As an example, information related to the mapping of the resource elements may be indicated by physical layer channels, e.g., PDCCH, R-PDCCH, R-PDCCH like channel, and so on.

According to an example embodiment, the information may be indicated semi-statically. As an example, the information related to the mapping of the elements may be indicated through higher layer signaling, such as radio resource control (RRC) signaling.

The cell may then transmit the indication to the communications device(s) (block 915). According to an example embodiment, the indication may be transmitted to the UE in the form of a scheduling message. According to another example embodiment, upper layer signaling and scheduling message may be used jointly to send the indication to the UE. The upper layer signaling, such as RRC signaling, may configure the possible combinations of the indications and the scheduling message indicates one of the combinations to the UE.

The cell may map data symbols in the data to be transmitted that it is sending to a communications device(s) to resource elements, wherein the mapping is based on the resource element utilization information (block 920). According to an example embodiment, the mapping of the data symbols may include mapping some of the data symbols onto some resource elements corresponding to resource elements used to carry specified signals, such as CRS, P-BCH, SCH, and so forth, in transmissions made by other cell(s). The use of resource elements corresponding to resource elements used to carry the specified signals in transmissions made by other cell(s) may be dependent upon the transmission's type.

According to an example embodiment, the cell can map data symbols from the data to be transmitted onto resource elements corresponding to resource elements used to carry the specified signals, such as CRS, P-BCH, SCH, and so forth, in transmissions made by other cell(s). The cell, however, continues to skip resource elements normally used to carry its own CRS.

As an example, if three cells are transmitting at least two data streams to a communications device in a CoMP joint processing mode, then the cell (e.g., a serving cell) may map data symbols from the data stream(s) to resource elements corresponding to resource elements used to carry the specified signals, such as CRS, P-BCH, SCH, and so forth, in transmissions made by other two cells.

The cell may transmit the transmission to the communications device(s) (block 925).

FIG. 9b illustrates a flow diagram of communications device operations 950 in receiving a transmission from one or more cells, such as eNB, a RN, a cell, a RRH, or so on. Communications device operations 950 may be indicative of operations occurring in a communications device, such as a UE, as the communications device receives a transmission from one or more cells. Communications device operations 950 may occur while the communications device is in a normal operating mode.

Communications device operations 950 may begin with the communications device receiving information related to a transmission from at least one of the one or more cells (block 955). According to an example embodiment, the information may be about a transmission to the communications device, including network resources, modulation and coding scheme, and so forth.

The communications device may receive at least one resource element utilization information (or indications thereof) from the at least one of the one or more cells (block 960). The information or the indication may be about a) the resource elements corresponding to resource elements used to carry the specified signals, such as CRS, P-BCH, SCH, and so forth, in the transmissions made by other cells are for symbol (or other information) transmission, b) the resource elements corresponding to resource elements used to carry the specified signals, such as CRS, P-BCH, SCH, and so forth, in transmissions made by other cells are not for symbol transmission, or c) a combination thereof, for resource elements transmitted by the cell(s) that transmitted the indication.

As discussed previously, the indication may explicitly or implicitly indicate the resource elements. Furthermore, the information may be dynamically indicated or semi-statically indicated.

The communications device may detect the transmission at the network resources specified by the transmission grant(s) (block 965).

The transmission may be decoded based on the information or the indication (block 970). As an example, if the indication indicates that a network resource carries a CRS, then the communications device may not attempt to detect the network resource. However, if the indication indicates that a network resource carries data symbols, then the communications device may attempt to detect the network resource.

The communications device may then process the received transmission (block 975). According to an example embodiment, processing the received transmission may include processing data in the received transmission with a processor, storing data in the received transmission to some form of memory, displaying data in the received transmission on a display device, and so forth.

Although the functional steps and/or non-functional acts may be illustrated in FIGS. 9a and 9b and described above in a particular order, the present invention is not necessarily limited to any particular ordering or combination of steps and/or acts.

Figure 10:
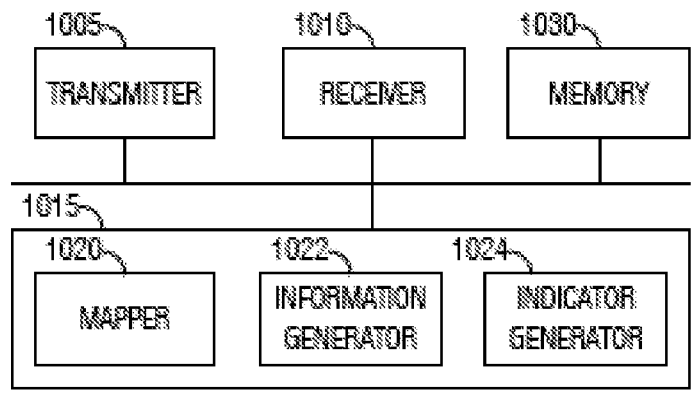
FIG. 10 provides an example communications device according to example embodiments described herein.

FIG. 10 provides an alternate illustration of a communications device 1000. Communications device 1000 may be an implementation of a cell, such as a cell of an eNB, a cell of a RN, or so on. Communications device 1000 may be used to implement various ones of the embodiments discussed herein. As shown in FIG. 10, a transmitter 1005 is configured to transmit information and indications. Communications device 1000 also includes a receiver 1010 that is configured to receive information.

A mapper 1020 is configured to map symbols onto resource elements based on communications device decisions, resource element utilization information, and/or resource elements. For example, mapper 1020 may map data symbols onto resource elements corresponding to resource elements used to carry the specified signals, such as CRS, P-BCH, SCH, and so forth, in transmissions made by other cells or mapper 1020 may skip resource elements corresponding to resource elements used to carry the specified signals, such as CRS, P-BCH, SCH, and so forth, in transmissions made by other cells. An information generator 1022 is configured to generate resource element utilization information for resource elements corresponding to resource elements used to carry the specified signals, such as CRS, P-BCH, SCH, and so forth, in transmissions made by other cells. An indicator generator 1024 is configured to generate an indication to indicate information about a) the resource elements corresponding to resource elements used to carry the specified signals, such as CRS, P-BCH, SCH, and so forth, in the transmissions made by other cells are for symbol (or other information) transmission, b) the resource elements corresponding to resource elements used to carry the specified signals, such as CRS, P-BCH, SCH, and so forth, in transmissions made by other cells are not for symbol transmission, or c) a combination thereof. A memory 1030 is configured to store indications, data symbols, and so forth.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while mapper 1020, information generator 1022, and indicator generator 1024 may be software modules executing in a microprocessor (such as processor 1015) or a custom circuit or a custom compiled logic array of a field programmable logic array.

Figure 11:
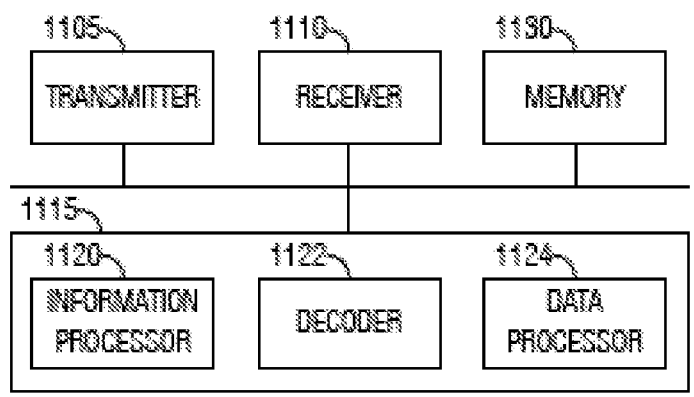
FIG. 11 provides an example communications device according to example embodiments described herein.

FIG. 11 provides an alternate illustration of a communications device 1100. Communications device 1100 may be an implementation of a communications controller, such as an eNB, a RN, or so on. Communications device 1100 may be used to implement various ones of the embodiments discussed herein. As shown in FIG. 11, a transmitter 1105 is configured to transmit information and a receiver 1110 that is configured to receive information and indications.

An information processor 1120 is configured to process resource element utilization information (or an indicator thereof) about a) the resource elements corresponding to resource elements used to carry the specified signals, such as CRS, P-BCH, SCH, and so forth, in the transmissions made by other cells are for symbol (or other information) transmission, b) the resource elements corresponding to resource elements used to carry the specified signals, such as CRS, P-BCH, SCH, and so forth, in transmissions made by other cells are not for symbol transmission, or c) a combination thereof. Indicator processor 1120 extracts information carried in the indication. A decoder 1122 decodes a received transmission, making use of the information indicated by the indication to determine which resource elements to decode or not decode. As an example, if the indication indicates that a network resource carries a CRS, then the communications device will not attempt to detect the network resource. However, if an indication indicates that a network resource carries data symbols, then the communications device will attempt to detect the network resource.

A data processor 1124 is configured to process the received transmission, which may include processing data in the received transmission with a processor, storing data in the received transmission to some form of memory, displaying data in the received transmission on a display device, and so forth. A memory 1130 is configured to store the indications, received transmissions, and so forth.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, receiver 1110 and transmitter 1105 may be implemented as a specific hardware block, while information processor 1120, decoder 1122, and data processor 1124 may be software modules executing in a microprocessor (such as processor 1115) or a custom circuit or a custom compiled logic array of a field programmable logic array.

The above described embodiments of communications device 1000 and communications device 1100 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 9a and 9b—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for cell operations, the method comprising:
   transmitting, by a cell in a cooperating set, an indication of resource element utilization information to a communications device, wherein the resource element utilization information comprises utilization information for a subset of resource elements out of a plurality of resource elements, wherein the subset of resource elements corresponds to other resource elements for specified signal transmissions of one or more other cells within the cooperating set, and wherein transmitting the indication comprises:
      transmitting a plurality of potential indications for potential resource element utilization information to the communication device with an upper layer message; and
      identifying the indication to the communication device with a scheduling message, wherein the indication is one of the plurality of potential indications; and
   mapping symbols intended for the communications device to the plurality of resource elements in accordance with the resource element utilization information.

2. The method of claim 1, wherein the specified signals comprises cell-specific reference signals, a physical broadcast channel, a sync channel, or combinations thereof.

3. The method of claim 1, wherein the indication comprises information indicating that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof.

4. The method of claim 1, wherein the indication comprises a field in a message, and wherein the field contains the information or a representation of the information.

5. The method of claim 4, wherein the field comprises a newly defined field, a previously defined field, a portion of at least one previously defined field, or a combination thereof.

6. The method of claim 1, wherein the indication comprises a previously defined information set.

7. The method of claim 6, wherein the previously defined information set comprises a set of transmission modes, a set of CoMP modes, or a combination thereof.

8. The method of claim 1, wherein transmitting the indication comprises transmitting the scheduling message on a physical layer channel.

9. The method of claim 8, wherein the physical layer channel comprises a Physical Downlink Control Channel, a Relay-Physical Downlink Control Channel, or a combination thereof.

10. The method of claim 1, wherein the upper layer message comprises a Radio Resource Control message.

11. The method of claim 1, wherein the symbols comprise data symbols, reference signals, data symbols with precoding information different from precoding information associated with data symbols mapped to resource elements in the plurality of resource elements but not in the subset of resource elements, null symbols, or combinations thereof.

12. A cell comprising:
    an information generator, the information generator configured to generate resource element utilization information, wherein the resource element utilization information comprises utilization information for a subset of resource elements out of a plurality of resource elements, wherein the subset of resource elements corresponds to other resource elements for specified signal transmissions of one or more other cells within a cooperating set, and wherein the cell is a member of the cooperating set;
    a mapper coupled to the information generator, the mapper configured to map symbols intended for a communications device to a plurality of resource elements in accordance with the resource element utilization information;
    an indicator generator coupled to the information generator, the indicator generator configured to generate an indication for the resource element utilization information; and
    a transmitter coupled to the information generator and to the mapper, the transmitter configured to transmit the indication for the resource element utilization information to the communications device by transmitting a plurality of potential indications for potential resource element utilization information with an upper layer message and identifying the indication with a scheduling message, wherein the indication is one of the plurality of potential indications.

13. The cell of claim 12, wherein the indication comprises a previously defined information set.

14. The cell of claim 13, wherein the previously defined information set comprises a set of transmission modes, a set of CoMP modes, or a combination thereof.

15. The cell of claim 12, wherein the indication comprises a field in a message, wherein the field contains the information or a representation of the information.

16. The cell of claim 15, wherein the field comprises a newly defined field, a previously defined field, a portion of at least one previously defined field, or a combination thereof.

17. The cell of claim 12, wherein the transmitter transmits the scheduling message on a physical layer channel.

18. The cell of claim 17, wherein the physical layer channel comprises a Physical Downlink Control Channel, a Relay-Physical Downlink Control Channel, or a combination thereof.

19. The cell of claim 12, wherein the upper layer message comprises a Radio Resource Control message.

20. The cell of claim 12, wherein the resource element utilization information comprises information that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof.

21. A method of communications device operations, the method comprising:
    receiving an indication of resource element utilization information for a cell in a cooperating set, wherein the resource element utilization information comprises utilization information for a subset of resource elements out of a plurality of resource elements, wherein the subset of resource elements corresponds to other resource elements for specified signal transmissions of one or more other cells within the cooperating set, and wherein receiving the indication comprises:

receiving a plurality of potential indications for potential resource element utilization information with an upper layer message; and receiving an identification of the indication with a scheduling message, wherein the indication is one of the plurality of potential indications; and receiving signals; and decoding the signals based on the resource element utilization information.

22. The method of claim 21, wherein the resource element utilization information comprises information that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof, and wherein decoding the signals comprises not decoding the signals carried by the subset of resource elements.

23. The method of claim 21, wherein the resource element utilization information comprises information that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof, and wherein decoding the signals comprises decoding the signals carried by the subset of resource elements.

24. The method of claim 21, wherein the indication comprises a field in a message, wherein the field contains the information or a representation of the information.

25. The method of claim 24, wherein the field comprises a newly defined field, a previously defined field, a portion of at least one previously defined field, or a combination thereof.

26. The method of claim 25, wherein the indication comprises a previously defined information set.

27. The method of claim 26, wherein the previously defined information set comprises a set of transmission modes, a set of CoMP modes, or a combination thereof.

28. The method of claim 21, wherein receiving resource element utilization information comprises receiving the scheduling message on a physical layer channel.

29. The method of claim 28, wherein the physical layer channel comprises a Physical Downlink Control Channel, a Relay-Physical Downlink Control Channel, or a combination thereof.

30. The method of claim 21, wherein the upper layer message comprises a Radio Resource Control message.

31. A communications device comprising:

a receiver configured to receive resource element utilization information for a cell in a cooperating set and to receive signals, wherein the resource element utilization information comprises utilization information for a subset of resource elements out of a plurality of resource elements, wherein the subset of resource elements corresponds to other resource elements for specified signal transmissions of one or more other cells within the cooperating set, and wherein the receiver receives resource element utilization information by:

receiving a plurality of potential indications for potential resource element utilization information with an upper layer message; and receiving an identification of an indication of the resource element utilization information with a scheduling message, wherein the indication is one of the plurality of potential indications;

an information processor coupled to the receiver, the information processor configured to process the resource element utilization information to extract information about the plurality of resource elements; and a decoder coupled to the receiver and to the information processor, the decoder configured to decode the received signals based on the resource element utilization information.

32. The communications device of claim 31, wherein the resource element utilization information comprises information that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof, and wherein the decoder does not decode the signals carried by the subset of resource elements.

33. The communications device of claim 31, wherein the resource element utilization information comprises information that the subset of resource elements carries data symbols, data symbols with precoding information different from precoding information associated with data symbols mapped to resource elements in the plurality of resource elements but not in the subset of resource elements, data symbols based on a first reference signal different from a second reference signal used by the cell, null symbols, or combinations thereof, and wherein the decoder decode the signals carried by the subset of resource elements.

34. The communications device of claim 31, wherein the receiver receives the scheduling message over a physical layer channel.

35. The communications device of claim 31, wherein the upper layer message comprises a Radio Resource Control message.

* * * * *